United States Patent
Brockhaus

(10) Patent No.: US 6,820,499 B2
(45) Date of Patent: Nov. 23, 2004

(54) METHOD FOR DETERMINING THE UNCERTAINTY FACTOR OF A MEASURING PROCEDURE EMPLOYING A MEASURING FREQUENCY

(75) Inventor: Helmut Brockhaus, Dinslaken (DE)

(73) Assignee: Krohne Messtechnik GmbH & Co. K.G., Duisburg (DE)

( * ) Notice: Subject to any disclaimer, the term of this patent is extended or adjusted under 35 U.S.C. 154(b) by 27 days.

(21) Appl. No.: 10/376,524

(22) Filed: Feb. 28, 2003

(65) Prior Publication Data

US 2003/0213282 A1 Nov. 20, 2003

(30) Foreign Application Priority Data

May 14, 2002 (DE) .......................................... 102 21 510
Nov. 29, 2002 (DE) .......................................... 102 56 103

(51) Int. Cl.$^7$ ................................................ G01F 1/60
(52) U.S. Cl. ................................................... 73/861.17
(58) Field of Search ................................. 73/1.34, 1.88, 73/861.11, 861.17, 861.05, 861.08; 702/100; 324/76.52, 76.68, 76.74, 76.16

(56) References Cited

U.S. PATENT DOCUMENTS

| | | | | | |
|---|---|---|---|---|---|
| 3,316,762 | A | * | 5/1967 | Westersten | 73/861.17 |
| 3,943,765 | A | * | 3/1976 | Takada et al. | 73/861.17 |
| 4,157,035 | A | * | 6/1979 | Doll et al. | 73/861.17 |
| 4,159,645 | A | * | 7/1979 | Cushing | 73/861.17 |
| 4,291,332 | A | * | 9/1981 | Kato et al. | 348/539 |
| 4,370,892 | A | * | 2/1983 | Schmoock | 73/861.12 |
| 4,563,637 | A | * | 1/1986 | De Bortoli et al. | 324/76.17 |
| 4,635,097 | A | * | 1/1987 | Tatami | 348/539 |
| 4,648,279 | A | * | 3/1987 | Milsch et al. | 73/861.17 |
| 4,676,112 | A | * | 6/1987 | Uematsu et al. | 73/861.17 |
| 4,704,907 | A | * | 11/1987 | Mannherz et al. | 73/861.17 |
| 4,704,908 | A | * | 11/1987 | Blatter | 73/861.17 |
| 4,709,583 | A | * | 12/1987 | De Paepe et al. | 73/861.17 |
| 4,856,345 | A | * | 8/1989 | Mochizuki | 73/861.17 |
| 5,018,391 | A | * | 5/1991 | Doll | 73/861.17 |
| 5,079,957 | A | * | 1/1992 | Wehrs | 73/861.17 |
| 5,578,764 | A | * | 11/1996 | Yokoi et al. | 73/861.356 |
| 5,905,206 | A | * | 5/1999 | Herwig et al. | 73/861.12 |
| 2004/0035180 | A1 | * | 2/2004 | Okuda et al. | 73/8 |

FOREIGN PATENT DOCUMENTS

| | | | |
|---|---|---|---|
| DE | 196 53 184 C2 | 7/1998 | |
| EP | 0 809 089 A2 | 5/1997 | |
| EP | 1079212 A2 | * 2/2001 | ............. G01F/1/58 |

* cited by examiner

Primary Examiner—Hezron Williams
Assistant Examiner—John Fitzgerald
(74) Attorney, Agent, or Firm—Cesari and McKenna, LLP

(57) ABSTRACT

A method is described for determining the uncertainty factor of a measuring process employing a measuring frequency, especially a magnetoinductive flow measuring procedure, whereby for each half-cycle of the measuring frequency at least one measured value is quantified by sampling a measuring signal. According to the method, the deviation of the measured values is determined at the measuring frequency but phase-shifted relative to the measuring frequency, and/or the deviation of the measured values is determined at a minimum of two frequencies differing from the measuring frequency and on the basis of the two deviations at the frequencies differing from the measuring frequency the deviation of the measured values at the measuring frequency is arrived at by interpolation or extrapolation. This permits easy access to the deviation at the measuring frequency, which is of significance as a diagnostic value.

14 Claims, 2 Drawing Sheets

METHOD FOR DETERMINING THE UNCERTAINTY FACTOR OF A MEASURING PROCEDURE EMPLOYING A MEASURING FREQUENCY

BACKGROUND OF THE INVENTION

1. Field of the Invention

This invention relates to a method for determining the uncertainty factor of a measuring procedure employing a measuring frequency, especially a magnetoinductive flow measuring procedure by which in each oscillatory half-cycle of the measuring frequency, a measuring signal is sampled for determining at least one measured value per signal.

The invention is particularly useful for application in a magnetoinductive flow measuring procedure without being limited thereto. Magnetoinductive flow measuring processes of the type mentioned above have been in the public domain for some time and have been widely employed for a variety of applications. The fundamental principle of a magnetoinductive flowmeter for moving media goes all the way back to Faraday who as early as 1832 proposed the use of the electrodynamic induction principle for measuring flow rates. Faraday's law of induction stipulates that in a medium flowing through a magnetic field and containing charge carriers, an electric field intensity is generated perpendicular to the flow direction and to the magnetic field. A magnetoinductive flowmeter utilizes Faraday's law of induction by means of a magnet that typically consists of two magnetic poles, each with a field coil, and generates a magnetic field perpendicular to the direction of the flow in the measuring tube. Within that magnetic field, each volume element of the flowing medium, traveling through the magnetic field and containing a certain number of charge carriers, contributes the field intensity generated in the volume element concerned to the measuring voltage that can be collected via measuring electrodes. In conventional magnetoinductive flowmeters, the measuring electrodes are designed either for conductive or for capacitive coupling with the flowing medium. One salient feature of magnetoinductive flowmeters is the proportionality between the measured voltage and the flow rate of the medium across the diameter of the measuring tube, i.e. between the measuring voltage and the flow volume.

2. Description of the Prior Art

In the magnetoinductive flow measuring process of the actual flow measuring operation, the magnetic field is usually switched in periodically alternating fashion. The prior art shows a variety of approaches to that effect. For example, magnetoinductive flow measurement can be accomplished using an alternating field, in which case the field coils of the magnet typically receive a sinusoidal 50 Hz voltage directly from an AC line source. However, the measuring voltage generated by the flow between the measuring electrodes tends to be heterodyned by transformation noise as well as line voltage interference.

Current magnetoinductive flow measuring practice, therefore, generally employs a switched direct-current field. A switched continuous field of that nature is obtained by feeding a periodically polarity-alternating square-wave current to the field coils of the magnet. Also possible, however, is a magnetoinductive flow measurement process using a pulsating continuous field obtained by only periodically supplying the field coils of the magnet with a time-controlled square-wave current of unchanging polarity. Yet a method that periodically reverses the field current is preferred because alternating the polarity of the magnetic field permits the suppression of interference potentials such as galvanic noise.

Using a pole-reversible, switched constant-current field makes it necessary after each reversal to wait for the magnetic field to stabilize. That is followed by the up-slope integration of the measured voltage, for instance the voltage differential between the electrodes, until the field current polarity is again reversed. Waiting for the magnetic field to stabilize is important for achieving good measuring accuracy.

One very important variable in a magnetoinductive flow measuring procedure as well as in other measuring techniques, where in each half-cycle of the measuring frequency at least one measured value is determined by sampling a measuring signal, is the uncertainty factor of the measuring process since that variable can be utilized for a variety of diagnostic purposes. The uncertainty factor is essentially determined by the irregular divergence pattern of the measured values. This divergence of the measured values is a gauge for their degree of fluctuation and usually represents the standard deviation of the measured values.

The problem with a magnetoinductive flow measuring procedure lies in the fact that the flow rate itself typically tends to be less than constant and should therefore be measured. What this means is that in determining the standard deviation of the measured values at the measuring frequency it is not possible to tell whether that standard deviation is caused by a scattering of the measured values, originating in the electrode voltage differential that would constitute a noise factor, or whether the cause, again detected at the measuring frequency, is the very change in the flow rate that is to be measured.

For verifying the dependability of a flow rate measurement obtained with a magnetoinductive flowmeter, EP 0 521 448 A2 describes an approach whereby the absolute values of the measuring voltages collected at the two measuring electrodes are respectively compared in a half-cycle of the measuring frequency, with any deviation between these absolute values triggering an alarm signal. DE 34 23 076 C2 on its part proposes to quantify alternating and constant-current noise voltage components in a magnetoinductive flow measuring procedure by sampling the measuring voltage at many times the excitation frequency of the magnetic field.

For identifying in a magnetoinductive flow measuring procedure a noise signal superposed over the measuring signal, allowing the measuring signal to be appropriately corrected, DE 199 38 160 A1 proposes a gapped excitation of the field coils that generate the magnetic field, making it possible for each of the measuring periods to include, in addition to the two half-cycles of the magnetic field, a span before the first half-cycle and a span after the last half-cycle of the magnetic field. The additional signals acquired before and, respectively, after the corresponding half-cycle of the magnetic field are then used for the above-mentioned correction and preferably the complete elimination of the noise signal heterodyned over the measuring signal.

Finally, JP 2000-028408 describes a method whereby, for flow signals, noise suppression is achieved by applying the mean value of these flow signals obtained in a sampling process whose frequency is twice the excitation frequency of the magnetic field. This method utilizes the fact that values detected at times in which no magnetic field is present should result in a flow value of zero.

The aforementioned prior-art methods, however, do not offer the possibility of quantifying the irregular divergence of the measured values, for instance their standard deviation, specifically at the measuring frequency.

SUMMARY OF THE INVENTION

It is, therefore, the objective of this invention to introduce a method for determining the uncertainty factor, permitting in simple fashion the quantification of the measured-value irregularities even at the measuring frequency.

The method according to this invention that achieves the stated objective for the application first above described is characterized in that the irregular divergence, i.e. deviation of the measured values, is determined at the measuring frequency but phase-shifted relative to the measuring frequency, and/or that the deviation of the measured values is determined at least at two frequencies that differ from the measuring frequency, and that on the basis of the two deviations at the frequencies that differ from the measuring frequency, the deviation of the measured values at the measuring frequency is interpolated or extrapolated.

The method according to the invention is derived from the discovery, made in experiments without field excitation i.e. without flow measurements, to the effect that the curve of the frequency spectrum of the electrode voltage differential is essentially steady. It follows that the method according to the invention can also be applied to all other measuring processes employing a measuring frequency to the extent that they meet the same requirement, that being a steady frequency spectrum. The feasibility of the method according to the invention is based on the fact that in each half-cycle of the measuring frequency a precise measured value is acquired by sampling the measuring signal. However, in a conceptual enhancement of the invention, multiple consecutive measured values are determined in each half-cycle of the measuring frequency through a sampling of the measuring signal. Significantly, it is possible in this fashion to quantify the irregular divergence or deviation at a frequency higher than the measuring frequency and also to determine the deviation of the measured values at the measuring frequency, but phase-shifted relative to the measuring frequency. In this context, it should be noted that in the case of multiple consecutive measured values, these measured values can be, but do not necessarily have to be, acquired in immediate succession, i.e. they may be spaced apart by time intervals.

As a main feature in a preferred embodiment of the invention, the deviation is quantified at twice the measuring frequency and again at half the measuring frequency and the deviation at the measuring frequency is determined by a preferably linear interpolation between the deviation at twice the measuring frequency and the deviation at half the measuring frequency. As a prerequisite for this preferred embodiment of the method according to the invention, at least two consecutive measured values, preferably obtained through the integration of the measured signal over identical time spans, must be determined each half-cycle. When the interpolation technique is applied, this preferred embodiment of the method according to the invention is highly accurate yet easy to implement.

The divergence can be determined using different parameters. In a preferred embodiment of the invention, however, the divergence is determined with the aid of the standard deviation and in fact corresponds to the standard deviation. This, as indicated further above, has been a well-established prior-art approach in connection with other methods.

The frequencies that differ from the measuring frequency and are used for determining the divergence can essentially be selected at will. In a preferred embodiment of the invention, however, the frequencies that differ from the measuring frequency are in each case different from an odd-numbered multiple of the measuring frequency.

For the determination of the irregular divergence in a preferred embodiment of the invention, the measured values are subjected to a phase transformation or a frequency transformation. The phase transformation or frequency transformation is preferably obtained by multiplying the measured values by a predefined square function. In the applicable range, this square function preferably includes only the values +1 and −1 so that the predefined square function can be expressed especially by applying the Signum-function to a function that takes into account the phase position of the measured values. In this case, the Signum-function, denoted by sign ( ) in the following equations, is a function which, when applied to a value, delivers either the value +1 or −1 depending on whether the value to which the Signum-function is applied is positive or negative.

The phase transformation or frequency transformation of the measured values is preferably followed by a low pass filtering of the phase-transformed or frequency-transformed measured values. The low pass filtering is preferably accomplished using a short FIR (finite impulse response) filter.

The deviation acquired at the measuring frequency can now be used in different ways. In particular, a preferred enhancement of the invention provides for the divergence detected at the measuring frequency to be accessed as a diagnostic value by way of a signal output port, a display monitor and/or a digital communication interface. In a preferred implementation of the invention, a threshold function can be applied to the deviation detected at the measuring frequency so that, when a predefined alarm threshold is exceeded, an alarm message is triggered. As an alternative to an alarm message, a particular device may be switched. Moreover, a preferred implementation of the invention can provide for the deviation at the measuring frequency to serve as a parameter for an adaptive rejection filter, i.e. a rejector circuit. In particular, the bandwidth of the rejection filter, for instance as applied to the measured values, may be controlled as a function of the deviation at the measuring frequency.

Finally, in an enhanced implementation of the invention, the difference and/or the ratio of the deviation between a frequency above the measuring frequency and a frequency below the measuring frequency can be determined and accessed as a diagnostic value via a signal output port, a display monitor or a digital communication interface. This provides information on the frequency pattern of the deviation, with changes in the difference or ratio possibly indicating a change in the process. In this case as well, a preferred embodiment of the invention provides for a threshold function to be applied to the difference or ratio of the deviation between a frequency above the measuring frequency and a frequency below the measuring frequency so that, when a predefined alarm threshold is exceeded, an alarm message is triggered or a particular device is switched.

BRIEF DESCRIPTION OF THE DRAWINGS

There are numerous ways in which the method according to this invention can be devised and further enhanced. In this connection, attention is invited to the dependent claims and to the following detailed description of preferred embodiment of the invention with reference to the following drawings, in which:

DETAILED DESCRIPTION OF ILLUSTRATIVE EMBODIMENTS

Figure 1:
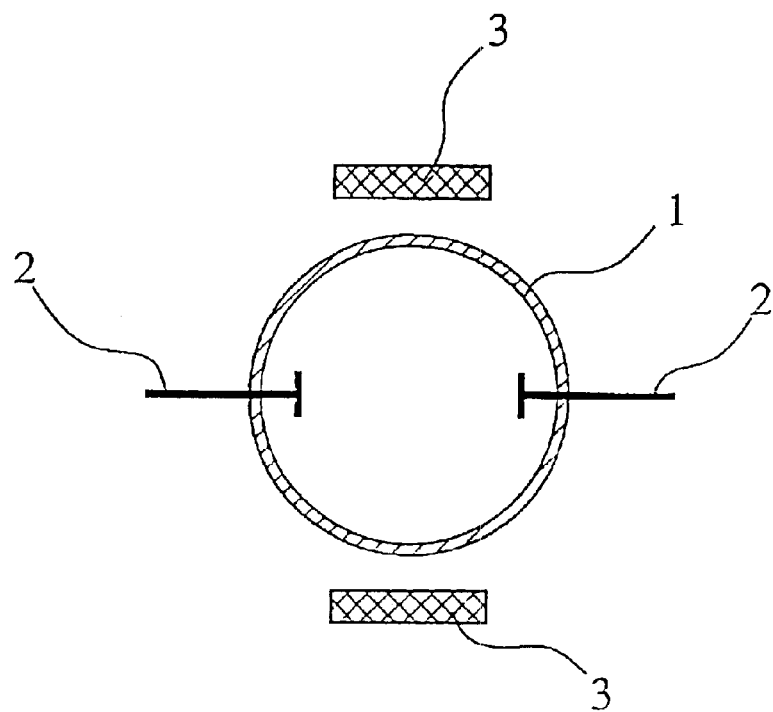
FIG. 1 is a schematic illustration showing the configuration of a magnetoinductive flowmeter for the implementation of the method according to this invention.

A magnetoinductive flowmeter for implementing the method according to this invention is schematically illustrated in FIG. 1. The magnetoinductive flowmeter incorporates a measuring tube 1 through which flows a medium, not illustrated. It also includes two measuring electrodes 2 for the collection of a measuring voltage induced by the medium that flows through the measuring tube 1. Two field coils 3 serve to generate a magnetic field perpendicular to the axis of the measuring tube 1 and to the connecting line between the measuring electrodes 2.

Figure 2:
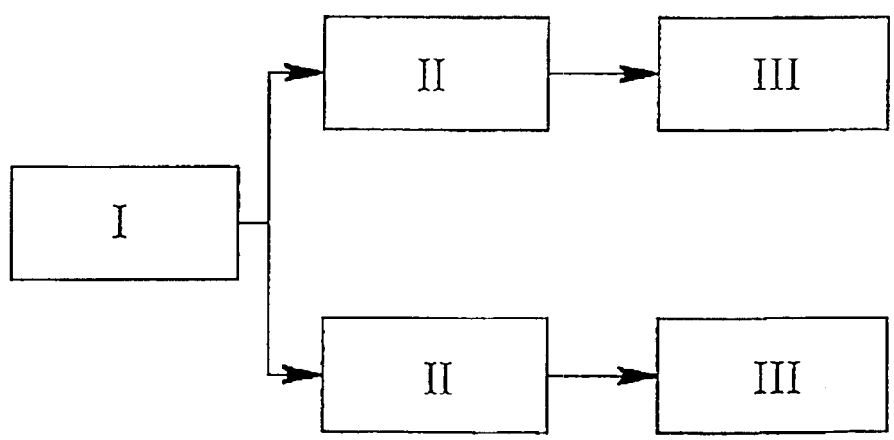
FIG. 2 shows the progression of the method for determining the uncertainty factor according to one preferred embodiment of the invention.

FIG. 2 shows schematically the signal processing sequence. It begins in Step I with a sampling of the signal differentials of the electrodes. Next, in Step II, a phase transformation or frequency transformation is applied by multiplication with a square function. In Step III the phase-transformed or frequency-transformed values are subjected to a low pass filtering function. The result will be a band-pass filter for the measuring frequency of the electrode voltage differential, with the measuring frequency in this case provided by the field frequency of the field current that is fed to the field coils 3 of the magnetoinductive flowmeter illustrated in FIG. 1. Steps II and III may be consolidated into one computational step and have been separated in this example for explanatory reasons only.

Figure 3:
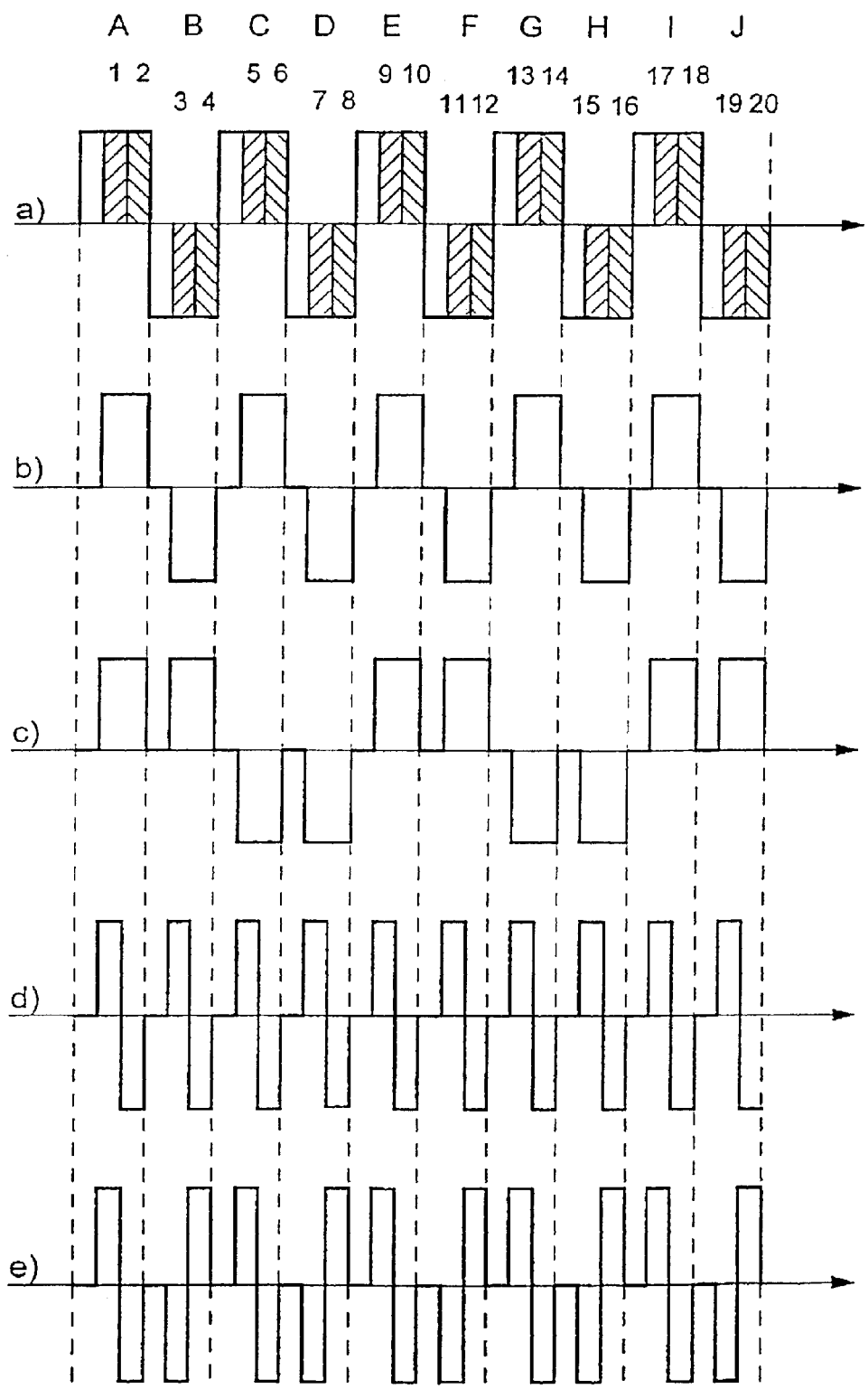
FIG. 3 is a schematic illustration of the measured values and of the square functions to be applied to the measured values for performing a phase transformation or frequency transformation according to the preferred embodiment of the invention.

For the preferred embodiments of the invention, the measuring signal is sampled as depicted in FIG. 3. In a first segment of each oscillatory half-cycle, no sampling of the measuring signal takes place since the system has to wait for the measuring signal to stabilize after the polarity reversal of the magnetic field. This is followed by two contiguous, consecutive sampling segments of equal length, marked 1 and 2 in half-cycle A, 3 and 4 in half-cycle B, etc. In the preferred embodiments of the invention, the measured values obtained by sampling the measuring signal in each case constitute mean values established over a time interval, i.e. time intervals 1, 2, 3 etc. Incidentally, the measuring signal is outlined in FIG. 3 at a) in highly simplified schematic fashion and, therefore, does not show the stabilization process.

FIG. 3 at b) to e) illustrates square wave functions applied in the preferred embodiments of the invention and, by multiplication with the measured-value curve of FIG. 3 at a), providing values that serve to detect the flow rate, to determine the deviation at a frequency that is lower than the measuring frequency, to determine the deviation at a frequency that is higher than the measuring frequency or to determine the deviation at, but phase-shifted relative to, the measuring frequency.

For the actual magnetoinductive flow measurement, i.e. for determining the actual flow rate, the measured values $U_i$ (i=1, 2, 3, . . . ) are multiplied as follows:

$$W_i = U_i \text{sign}\left(\sin\left(\frac{2\pi i}{4} - \frac{\pi}{4}\right)\right).$$

Because of the factor i/4 in the formula for calculating the flow rate, the data rate for the sampling values is higher by a factor of 4 than the measuring frequency. Inserting the values 1, 2, 3 produces a square function, as shown in FIG. 3 at b), with the values +1 in segments 1 and 2 of the half-cycle A and −1 in segments 3 and 4 of the half-cycle B, etc. Multiplying the square function of FIG. 3 at b) by the measured signal shown in FIG. 3 at a) produces flow values $W_i$. These $W_i$ values are then subjected to low-pass filtering (Step III) as described in detail further below.

To obtain values for calculating the deviation at a frequency that is lower than the measuring frequency, i.e. at half the measuring frequency, the following multiplication is made:

$$W_i = U_i \text{sign}\left(\sin\left(\frac{2\pi i}{8} - \frac{\pi}{8}\right)\right).$$

FIG. 3 at c) shows the corresponding progression of the square-wave curve.

To obtain values for calculating the deviation at a frequency that is higher than the measuring frequency, i.e. exactly twice the measuring frequency, the following multiplication is made:

$$W_i = U_i \text{sign}\left(\sin\left(\frac{2\pi i}{2} - \frac{\pi}{2}\right)\right).$$

FIG. 3 at d) shows the corresponding progression of the square-wave curve.

To obtain values for calculating the deviation at a frequency corresponding to the measuring frequency but phase-shifted by 90° ($\pi/2$) relative to the latter, the following multiplication is made:

$$W_i = U_i \text{sign}\left(\frac{2\pi i}{4} + \frac{\pi}{4}\right).$$

FIG. 3 at e) shows the corresponding progression of the square-wave curve.

As mentioned above, the $W_i$ values must then be subjected to low-pass filtering. For the preferred embodiments of the invention described, a short FIR filter is used in this case; for filtering over two half-waves the following calculation rule is applied, with the values $X_i$ representing the low-pass-filtered values:

$$X_i = \frac{1}{4}(W_{i-3} + W_{i-2} + W_{i-1} + W_i).$$

For filtering across three half-waves the following calculation rule is applied:

$$X_1 = \frac{1}{8}(W_{i-5} + W_{i-4} + 2W_{i-3} + 2W_{i-2} + W_{i-1} + W_i).$$

The values $X_i$ thus obtained can then be used, for instance, to determine the standard deviation, the divergence at the measuring frequency. That divergence then corresponds directly to the standard deviation. This is directly obtainable when the deviation was calculated at a frequency identical to the measuring frequency but phase-shifted by 90° relative to the latter or was arrived at by a preferably linear interpolation between the deviations detected at frequencies higher and, respectively, lower than the measuring frequency.

If the procedural Steps II and III are combined into one step, low-pass-filtered values can be determined by applying, for instance, the following specific calculation rules, with the subscripts B, C, D, . . . representing the respective half-cycle.

Calculation of a low-pass-filtered flow rate M at the measuring frequency:

$$M_B = \tfrac{1}{4}(U_1 + U_2 - U_3 - U_4)$$

$$M_C = \tfrac{1}{4}(-U_3 - U_4 + U_5 + U_6)$$

$$M_D = \tfrac{1}{4}(U_5 + U_6 - U_7 - U_8)$$

$$M_E = \tfrac{1}{4}(-U_7 - U_8 + U_9 + U_{10})$$

Calculation of low-pass-filtered values L for determining the deviation at half the measuring frequency:

$$L_D = \tfrac{1}{8}(U_1 + U_2 + U_3 + U_4 - U_5 - U_6 - U_7 - U_8)$$

$$L_E = \tfrac{1}{8}(U_3 + U_4 + U_5 + U_6 - U_7 - U_8 - U_9 - U_{10})$$

$$L_F = \tfrac{1}{8}(U_5 + U_6 + U_7 + U_8 - U_9 - U_{10} - U_{11} - U_{12})$$

$$L_G = \tfrac{1}{8}(U_7 + U_8 + U_9 + U_{10} - U_{11} - U_{12} - U_{13} - U_{14})$$

Calculation of low-pass-filtered values H for determining the deviation at a frequency identical to the measuring frequency, but phase-shifted by 90° relative to the latter:

$$H_B = \tfrac{1}{4}(U_1 - U_2 + U_3 - U_4)$$

$$H_C = \tfrac{1}{4}(U_3 - U_4 + U_5 - U_6)$$

$$H_D = \tfrac{1}{4}(U_5 - U_6 + U_7 - U_8)$$

$$H_E = \tfrac{1}{4}(U_7 - U_8 + U_9 - U_{10})$$

The values $U_i$ (i=1, 2, 3, . . . ) again represent the mean values in segments i of the half-cycles A, B, C, . . . , i.e. the electrode differential signals integrated in that segment.

The above-mentioned calculating rules result in values L and H, respectively, on the basis of which the deviation is arrived at, specifically by determining their standard deviation. These calculation rules are merely simple examples. More complex calculation rules are possible, for instance for the flow rate M:

$$M_C = \frac{1}{8}(U_1 + U_2 - 2(U_3 + U_4) + U_5 + U_6).$$

This can then be suitably transferred to the additional flow values for the subsequent half-cycles D, E, F.

What is claimed is:

1. A method for determining the uncertainty factor of a measuring process employing a measuring frequency, in particular a magnetoinductive flow measuring procedure, whereby for multiple half-cycles of the measuring frequency in each half-cycle at least one measured value is quantified by sampling a measuring signal resulting in measured values, wherein the divergence of the measured values is determined at the measuring frequency but phase-shifted relative to the measuring frequency or the divergence of the measured values is determined at a minimum of two frequencies that differ from the measuring frequency and on the basis of the two divergences at said frequencies that differ from the measuring frequency, the deviation of the measured values at the measuring frequency is quantified by interpolation or extrapolation.

2. The method as in claim 1, wherein, for each half-cycle of the measuring frequency, the measuring signal is sampled for determining a multiplicity of chronologically consecutive measured values.

3. The method as in claim 2, wherein the divergence is determined at twice the measuring frequency as well as at half the measuring frequency and the deviation at the measuring frequency is determined by a preferably linear interpolation between the divergence at twice the measuring frequency and the divergence at half the measuring frequency.

4. The method as in one of the claims 1 to 3, wherein the divergence is the standard deviation.

5. The method as in one of the claims 1 to 3, wherein the frequencies that differ from the measuring frequency each differ from an odd-numbered multiple of the measuring frequency.

6. The method as in one of the claims 1 to 3, wherein for determining the deviation, the measured values are subjected to a phase transformation or a frequency transformation.

7. The method as in claim 6, wherein the phase transformation or frequency transformation is obtained by multiplying the measured values with a predefined square function.

8. The method as in claim 6, wherein the phase-transformed or frequency-transformed measured values are subjected to a low-pass filtering function.

9. The method as in claim 8, wherein a FIR filter is used for the low-pass filtering.

10. The method as in one of the claims 1 to 3, wherein the deviation determined at the measuring frequency is accessed as a diagnostic value via a signal output port, a display monitor and/or a digital communication interface.

11. The method as in one of the claims 1 to 3, wherein a threshold function is applied to the deviation determined at the measuring frequency, whereby an alarm message is triggered in the event the predefined alarm threshold is exceeded.

12. The method as in one of the claims 1 to 3, wherein the deviation at the measuring frequency is used as a parameter for an adaptive rejection filter.

13. The method as in one of the claims 1 to 3, wherein the difference and/or the ratio between the deviation at a frequency above the measuring frequency and at a frequency below the measuring frequency is quantified and is accessed as a diagnostic value via a signal output port, a display and/or a digital communication interface.

14. The method as in claim 13, wherein a threshold function is applied to the difference and/or ratio between the deviation at a frequency above the measuring frequency and at a frequency below the measuring frequency, whereby an alarm message is triggered in the event a predefined alarm threshold is exceeded.

* * * * *